United States Patent [19]

Snelling

[11] Patent Number: 4,879,194

[45] Date of Patent: Nov. 7, 1989

[54] TRI-LEVEL, HIGHLIGHT COLOR IMAGING USING IONOGRAPHY

[75] Inventor: Christopher Snelling, Penfield, N.Y.

[73] Assignee: Xerox Corporation, Stamford, Conn.

[21] Appl. No.: 189,871

[22] Filed: May 2, 1988

[51] Int. Cl.[4] .............................................. G01D 15/06

[52] U.S. Cl. ...................................... 430/53; 346/157; 346/159; 430/42

[58] Field of Search .................... 430/53, 42; 346/157, 346/159

[56] References Cited

U.S. PATENT DOCUMENTS

| | | | |
|---|---|---|---|
| 3,457,900 | 7/1969 | Drexler | 118/637 |
| 4,078,929 | 3/1929 | Sundlach | 96/1.2 |
| 4,397,264 | 8/1983 | Hatch | 118/656 |
| 4,463,363 | 7/1984 | Sundlach et al. | 346/158 |
| 4,584,592 | 4/1986 | Tuan et al. | 346/159 |
| 4,660,059 | 4/1987 | O'Brien | 346/157 |
| 4,727,388 | 2/1988 | Sheridan et al. | 346/159 |
| 4,771,314 | 9/1988 | Parker et al. | 430/42 |

*Primary Examiner*—J. David Welsh

[57] ABSTRACT

A method and apparatus using ion projection to form a tri-level latent image on a charge retentive surface. The tri-level image which comprises two image areas and a background area is utilized for highlight imaging.

7 Claims, 3 Drawing Sheets

TRI-LEVEL, HIGHLIGHT COLOR IMAGING USING IONOGRAPHY

BACKGROUND OF THE INVENTION

This invention relates generally to electrostatic imaging and more particularly to tri-level, highlight color imaging utilizing ion projection or ionography for forming the tri-level latent electrostatic images.

In the practice of black and white xerography, the most common form of electrostatic imaging, it is the general procedure to form electrostatic latent images on a xerographic surface by first uniformly charging a photoconductive insulating surface or photoreceptor. The charge is selectively dissipated in accordance with a pattern of activating radiation corresponding to original images. The selective dissipation of the charge leaves a latent charge pattern on the imaging surface corresponding to the areas not struck by radiation.

This charge pattern is made visible by developing it with toner. The toner is generally a colored powder which adheres to the charge pattern by electrostatic attraction. The developed image is then fixed to the imaging surface or is transferred to a receiving substrate such as plain paper to which it is fixed by suitable fusing techniques.

Multi-color imaging has also been accomplished utilizing basic xerographic techniques. In this instance, the foregoing process is essentially repeated for three or four cycles. Thus, the charged photoconductive surface is successively exposed to filtered light images. After each exposure the resultant electrostatic latent image is then developed with toner particles corresponding in color to the subtractive primary of the filtered light image. For example, when a red filter is employed, the electrostatic latent image is developed with toner particles which are cyan in color. The cyan toner powder image is then transferred to the copy sheet. The foregoing process is repeated for a green filtered light image which is developed with magenta toner particles and a blue filtered light image which is developed with yellow toner particles.

Each differently colored toner powdered image is sequentially transferred to the copy sheet in superimposed registration with the powder image previously transferred thereto. In this way, three toner or more powder images are transferred sequentially to the copy sheet. After the toner powder images have been transferred to the copy sheet, they are permanently fused thereto.

The foregoing color imaging process is known as full color imaging. Another color imaging process is known as highlight color imaging. In highlight color imaging two different color developers are customarily employed, usually black and some other color, for example, red. In one type of highlight color imaging, a tri-level image is formed on the imaging surface utilizing a three level ROS (Raster Output Scanner) to form the tri-level image on a charge retentive surface that had previously been uniformly charged. The tri-level image comprises two image areas and a background area.

The concept of tri-level zerography is described in U.S. Pat. No. 4,078,929 issued in the name of Gundlach. The patent to Gundlach teaches the use of tri-level xerography as a means to achieve single-pass highlight color imaging. As disclosed therein the charge pattern is developed with toner particles of first and second colors. The toner particles of one of the colors are positively charged and the toner particles of the other color are negatively charged. In one embodiment, the toner particles are supplied by a developer which comprises a mixture of triboelectrically relatively positive and relatively negative carrier beads. The carrier beads support, respectively, the relatively negative and relatively positive toner particles. Such a developer is generally supplied to the charge pattern by cascading it across the imaging surface supporting the charge pattern. In another embodiment, the toner particles are presented to the charge pattern by a pair of magnetic brushes. Each brush supplies a toner of one color and one charge. In yet another embodiment, the development system is biased to about the background voltage. Such biasing results in a developed image of improved color sharpness.

In tri-level xerography, the xerographic contrast on the charge retentive surface or photoreceptor is divided three, rather than two, ways as is the case in conventional xerography. The photoreceptor is charged, typically to 900 v. It is exposed imagewise, such that one image corresponding to charged image areas (which are subsequently developed by charged area development, i.e. CAD) stays at the full photoreceptor potential ($V_{ddp}$ or $V_{cad}$, see FIGS. 1*a* and 1*b*). The other image is exposed to discharge the photoreceptor to its residual potential, i.e. $V_c$ or $V_{dad}$ (typically 100 v) which corresponds to discharged area images that are subsequently developed by discharged-area development (DAD). The background area is exposed such as to reduce the photoreceptor potential to halfway between the $V_{cad}$ and $V_{dad}$ potentials, (typically 500 v) and is referred to as $V_w$ or $V_{white}$. The CAD developer is typically biased about 100 v closer to $V_{cad}$ than $V_{white}$ (about 600 v), and the DAD developer system is biased about 100 v closer to $V_{dad}$ than $V_{white}$ (about 400 v).

Various techniques have heretofore been employed to develop electrostatic images as illustrated by the following disclosures which may be relevant to certain aspects of the present invention.

As disclosed in U.S. Pat. No. 3,457,900, magnetic brushes have been designed to give fringe field or solid area development by adjusting the conductivity of the carrier. It is also stated therein that they can also be made to tone areas of less charge and clean areas of greater charge giving what is known in the art as a reverse development.

As discussed in U.S. Pat. No. 4,397,264 which relates to a conventional xerographic image development system, conductive magnetic brush (CMB) development and insulating magnetic brush (IMB) development systems suffer from limitations in their abilities to meet the full range of copy quality requirements. Specifically, insulating magnetic brush development systems have difficulty in using one developer roller to develop both fine lines and solid areas. In order to optimize solid area development with an insulating developer material, the spacing between the developer roller and photoconductive surface must be made quite small. However, low density fine line development occurs at a large spacing to take advantage of the accuracy of fringe field development with insulating materials. This permits development with high cleaning fields so as to minimize background development.

As further discussed in the '264 patent, conductive magnetic brush development systems inherently fail to faithfully reproduce low density lines. Conductive developer materials are not sensitive to fringe fields. In order to achieve low density fine line development with conductive developer materials, the cleaning field must be relatively low. This produces relatively high background.

U.S. patent application Ser. No. 913,181 filed in the name of Parker et al and assigned to the same assignee as the instant application which relates to tri-level printing discloses apparatus for minimizing the contamination of one dry toner or developer by another dry toner or developer used for rendering visible latent electrostatic images formed on a charge retentive surface such as a photoconductive imaging member. The apparatus causes the otherwise contaminating dry toner or developer to be attracted to the charge retentive surface in its inter-document and outboard areas. The dry toner or developer so attracted is subsequently removed from the imaging member at the cleaning station.

U.S. patent application Ser. No. 78,750 filed in the name of Parker et al and assigned to the same assignee as the instant application which relates to tri-level printing discloses apparatus wherein undesirable transient development conditions that occur during start-up and shut-down in a tri-level xerographic system when the developer biases are either actuated or de-actuated are obviated by using a control strategy that relies on the exposure system to generate a spatial voltage ramp on the photoreceptor during machine start-up and shut-down. Furthermore, the development systems' bias supplies are programmed so that their bias voltages follow the photoreceptor voltage ramp at some predetermined offset voltage. This offset is chosen so that the cleaning field between any development roll and the photoreceptor is always within reasonable limits. As an alternative to synchronizing the exposure and developing characteristics, the charging of the photoreceptor can be varied in accordance with the change of developer bias voltage.

U.S. patent application Ser. No. 78,743 filed in the name of Jerome May and assigned to the same assignee as the instant application which relates to tri-level printing discloses apparatus wherein undesirable transient development conditions that occur during start-up and shut-down in a tri-level xerographic system when the developer biases are either actuated or de-actuated are obviated by the provision of developer apparatuses having rolls which are adapted to be rotated in a predetermined direction for preventing developer contact with the imaging surface during periods of start-up and shut-down. The developer rolls of a selected developer housing or housings can be rotated in the contact-prevention direction to permit use of the tri-level system to be utilized as a single color system or for the purpose of agitating developer in only one of the housings at time to insure internal triboelectric equilibrium of the developer in that housing.

U.S. patent application Ser. No. 947,321 filed in the name of Parker et al and assigned to the same assignee as the instant application which relates to tri-level printing discloses printing apparatus for forming toner images in black and at least one highlighting color in a single pass of a charge retentive imaging surface through the processing areas, including a development station, of the printing apparatus. The development station includes a pair of developer housings each of which has supported therein a pair of magnetic brush development rolls which are electrically biased to provide electrostatic development and cleaning fields between the charge retentive surface and the developer rolls. The rolls are biased such that the development fields between the first rolls in each housing and the charge retentive surface are greater than those between the charge retentive surface and the second rolls and such that the cleaning fields between the second rolls in each housing and the charge retentive surface are greater than those between the charge retentive surface and the first rolls.

U.S. patent application Ser. No. 95,486 filed in the name of Delmar Parker and assigned to the same assignee as the instant application which relates to tri-level printing discloses a magnetic brush developer apparatus comprising a plurality of developer housings each including a plurality of magnetic rolls associated therewith. The magnetic rolls disposed in a second developer housing are constructed such that the radial component of the magnetic force field produces a magnetically free development zone intermediate a charge retentive surface and the magnetic rolls. The developer is moved through the zone magnetically unconstrained and, therefore, subjects the image developed by the first developer housing to minimal disturbance. Also, the developer is transported from one magnetic roll to the next. This apparatus provides an efficient means for developing the complimentary half of a tri-level latent image while at the same time allowing the already developed first half to pass through the second housing with minimum image disturbance.

U.S. patent application Ser. No. 31,627 filed in the name of Parker et al and assigned to the same assignee as the instant application which relates to tri-level printing discloses an electronic printer employing tri-level xerography to superimpose two images with perfect registration during the single pass of a charge retentive member past the processing stations of the printer. One part of the composite image is formed using MICR toner, while the other part of the image is printed with less expensive black, or color toner. For example, the magnetically readable information on a check is printed with MICR toner and the rest of the check in color or in black toner that is not magnetically readable.

In addition to the techniques (i.e. conventional xerography and tri-level imaging) discussed above for forming the latent image, such images can alternately be formed by ion projection.

In commonly assigned U.S. Pat. No. 4,584,592 issued on Apr. 22, 1986 in the names of Hsing C. Tuan and Malcolm J. Thompson entitled, "Marking Head for Fluid Jet Assisted Ion Projection Imaging Systems", there is disclosed a marking array for use in conjunction with the marking head of an ion projection printer of the type disclosed in commonly assigned U.S. Pat. No. 4,463,363 issued on July 31, 1984 in the names of Robert W. Gundlach and Richard L. Bergen, entitled, "Fluid Jet Assisted Ion Projection Printing". In that printer, an imaging charge is placed upon a moving receptor sheet, such as paper, by means of a linear array of closely spaced minute air streams. Charged particles, comprising ions of a single polarity are generated in an ionization chamber of the marking head by a high voltage corona discharge and are then transported to and through the exit region of the marking head, where they are electrically controlled at each image pixel point, by an electrical potential applied to a modulating electrode. Selective control of the modulating electrodes in the array will enable spots of charge and absence of charge to be recorded on the receptor sheet for subsequent development.

A large area marking head for a page-width line printer would typically measure about 8.5 inches wide. A high resolution marking array capable of printing 200 to 400 spots per inch would, therefore, include about 1700 to 3400 conductive metallic modulation electrodes. The entire array measuring on the order of 8.5 inches by 0.7 inches also would include a multiplexed addressing assembly comprising metallic address lines and data lines and amorphous silicon thin film active switching elements. All of these elements would be fabricated upon a single low cost substrate, such as glass.

In commonly assigned U.S. Pat. No. 4,727,388 issued in the name of Sheridon et al on Feb. 23, 1987 there is disclosed an improved ion modulation structure for an ionorgaphic printer wherein the modulation structure comprises a marking array including a substrate upon which is integrally fabricated modulation electrodes, data buses, address buses and active thin film switches and the modulation electrodes comprise an alloy of aluminum and copper, the copper being in the range of 0.5% to 4%. Application of different potential values to the modulation electrodes enables control of the ion output in proportion to applied potential thereby permitting writing with a grey scale.

As illustrated in U.S. Pat. No. 4,660,059 issued in the name of John F. O'Brien, highlight color images are produced utilizing ion projection. As disclosed therein, an apparatus is used in which a document is printed in at least two different colors. Ions are projected onto the surface of a receiving member to record at least two electrostatic latent images thereon. Each of the electrostatic latent images recorded on the receiving member is developed with different color marking particles. The different color marking particles are transferred substantially simultaneously from the receiving member to the document to print the desired information thereof. The two different color images are formed in one embodiment of the invention by the use of a single ion projection device in a two-pass process. In the other embodiment, the two images are formed in a single pass but two ion projection devices are employed.

BRIEF SUMMARY OF THE INVENTION

The present invention provides a method and apparatus using ion projection to form a tri-level latent image on a charge retentive surface. The tri-level image comprises two image areas and a background area. The tri-level image is developed using two developer housings, each containing a different color toner.

DETAILED DESCRIPTION OF THE PREFERRED EMBODIMENT OF THE INVENTION

Figure 1A:
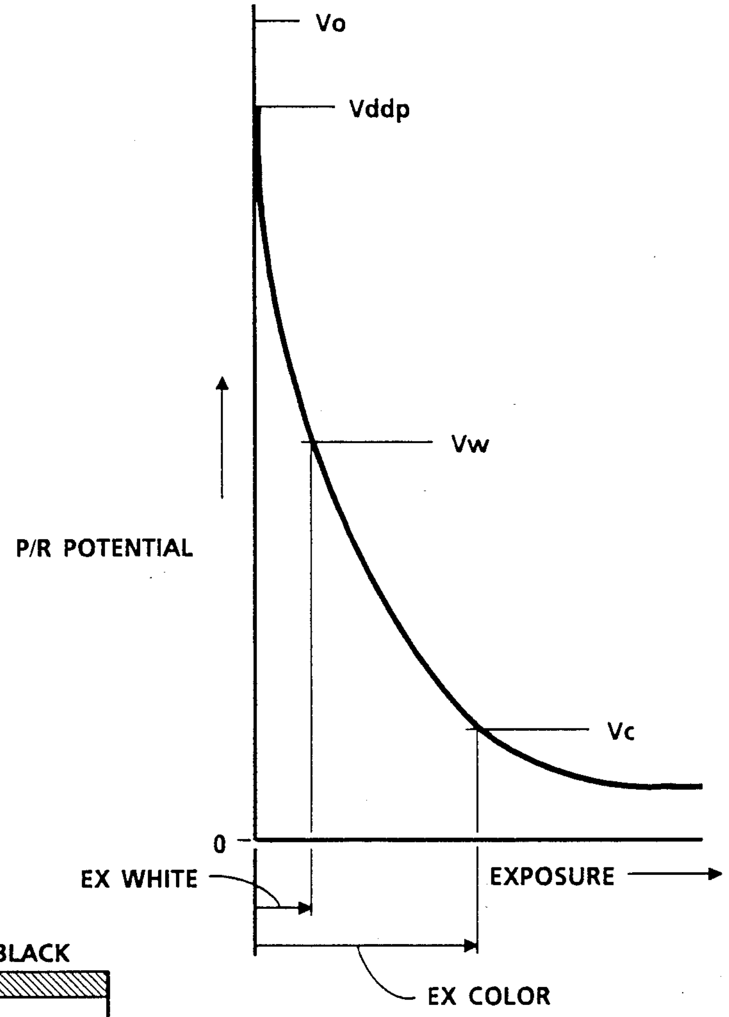
FIG. 1*a* is a plot of photoreceptor potential versus exposure illustrating a tri-level electrostatic latent image.

For a better understanding of the concept of tri-level imaging, a description thereof will now be made with reference to FIGS. 1*a* and 1*b*. FIG. 1*a* illustrates a tri-level electrostatic latent image which in the prior art is created by exposing a uniformly charged imaging surface using a three level ROS (Raster Output Scanner). Here $V_o$ is the initial charge level to thwich a charge retentive surface is uniformly charged, $V_{ddp}$ the dark discharge potential (unexposed), $V_w$ the white discharge level and $V_c$ the photoreceptor residual potential (full exposure).

Color discrimination in the development of the tri-level electrostatic latent image is achieved by passing the photoreceptor through two developer housings in tandem which housings are electrically biased to voltages which are offset from the background voltage $V_w$, the direction of offset depending on the polarity or sign of toner in the housing. One housing (for the sake of illustration, the first) contains developer with black toner having triboelectric properties such that the toner is driven to the most highly charged ($V_{ddp}$) areas of the latent image by the electric field between the photoreceptor and the development rolls biased by $V_{bb}$ (V black bias) as shown in FIG. 1*b*. Conversely, the triboelectric charge on the colored toner is a second housing is chosen so that the toner is urged towards parts of the latent image at residual potential, $V_c$ by the electric field existing between the photoreceptor and the development rolls in the second housing at bias voltage $V_{cb}$ (V color bias).

Figure 2:
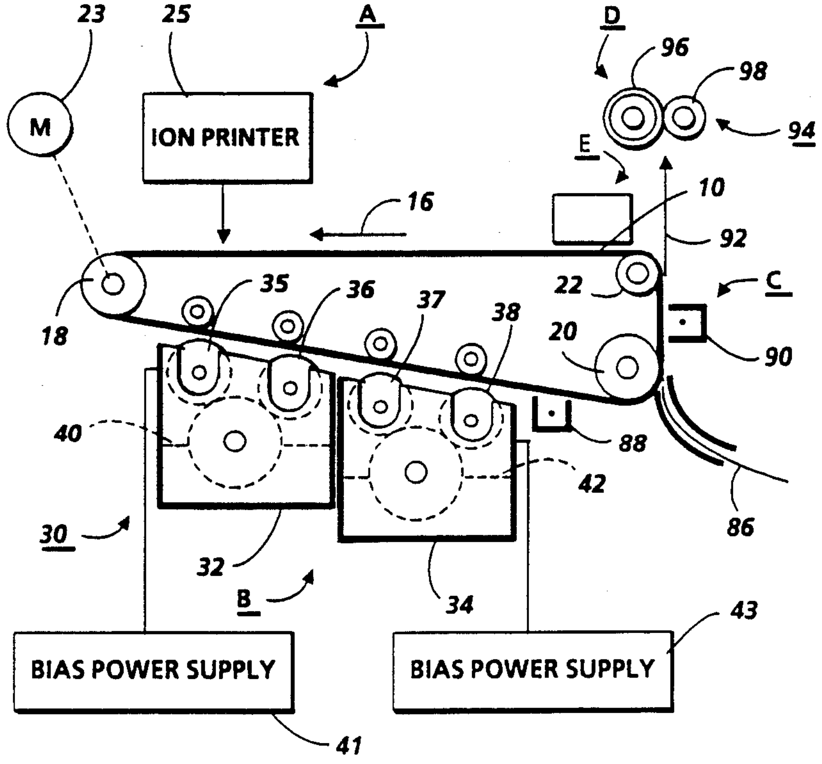
FIG. 2 is schematic illustration of a printing apparatus incorporating the inventive features of our invention.

As shown in FIG. 2, a printing machine incorporating our invention may utilize a charge retentive member in the form of a dielectric belt 10 mounted for movement past an imaging station A, developer station B, transfer station C and cleaning station D. Belt 10 moves in the direction of arrow 16 to advance successive portions thereof sequentially through the various processing stations disposed about the path of movement thereof. Belt 10 is entrained about a plurality of rollers 18, 20 and 22, the former of which can be used as a drive roller and the latter of which can be used to provide suitable tensioning of the photoreceptor belt 10. Motor 23 rotates roller 18 to advance belt 10 in the direction of arrow 16. Roller 18 is coupled to motor 23 by suitable means such as a belt drive.

As can be seen by further reference to FIG. 2, initially successive portions of belt 10 pass through an imaging station A. At the imaging station A, a tri-level, latent electrostatic image is formed on the dielectric belt. To this end, there is provided an ion projection device 25 which will be discussed in greater detail with respect to FIG. 3.

At development station B, a magnetic brush development system, indicated generally by the reference numeral 30 advances developer materials into contact with the electrostatic latent images. The development system 30 comprises first and second developer housings 32 and 34. Preferably, each magnetic brush development housing includes a pair of magnetic brush developer rollers. Thus, the housing 32 contains a pair of rollers 35,36 while the housing 34 contains a pair of magnetic brush rollers 37, 38. Each pair of rollers advances its respective developer material into contact with the latent image. Appropriate developer biasing is accomplished via power supplies 41 and 43 electrically connected to respective developer housings 32 and 34.

Color discrimination in the development of the electrostatic latent image is achieved by passing the photoreceptor past the two developer housings 32 and 34 in a single pass with the magnetic brush rolls 35, 36, 37 and 38 electrically biased to voltages which are offset approximately 100 volts from the background voltage $V_w$, the direction of offset depending on the polarity of toner in the housing. One housing e.g. 32 (for the sake of illustration, the first) contains developer with black toner 40 having triboelectric properties such that the toner is driven to the most highly charged ($V_{ddp}$) areas of the latent image by the electrostatic field (development field) between the photoreceptor and the development rolls biased as $V_{bb}$ as shown in FIG. 1*b*. Conversely, the triboelectric charge on colored toner 42 in the second housing is chosen so that the toner is used towards parts of the latent image at residual potential, $V_c$ by the electrostatic field (development field) existing between the photoreceptor and the development rolls in the second housing at bias voltages $V_{cb}$.

In tri-level xerography, the entire photoreceptor voltage difference ($|V_{ddp}-V_c|$, as shown in FIG. 1*a*) is shared equally between the charged area development (CAD) and the discharged area development (DAD). This correspons to $\approx$800 volts (if a realistic photoreceptor value for $V_{ddp}$ of 900 volts and a residual discharge voltage of 100 volts are assumed). Allowing an additional 100 volts for the cleaning fields ($|V_{bb}-V_{white}|$ and $|V_{white-Vcb}|$) in each development housing means an actual development contrast voltage for CAD of =300 volts and an $\approx$equal amount for DAD. In the foregoing case the 300 volts of contrast voltage is provided by electrically biasing the first developer housing to a voltage level of approximately 600 volts and the second developer housing to a voltage level of 400 volts.

Figure 3:
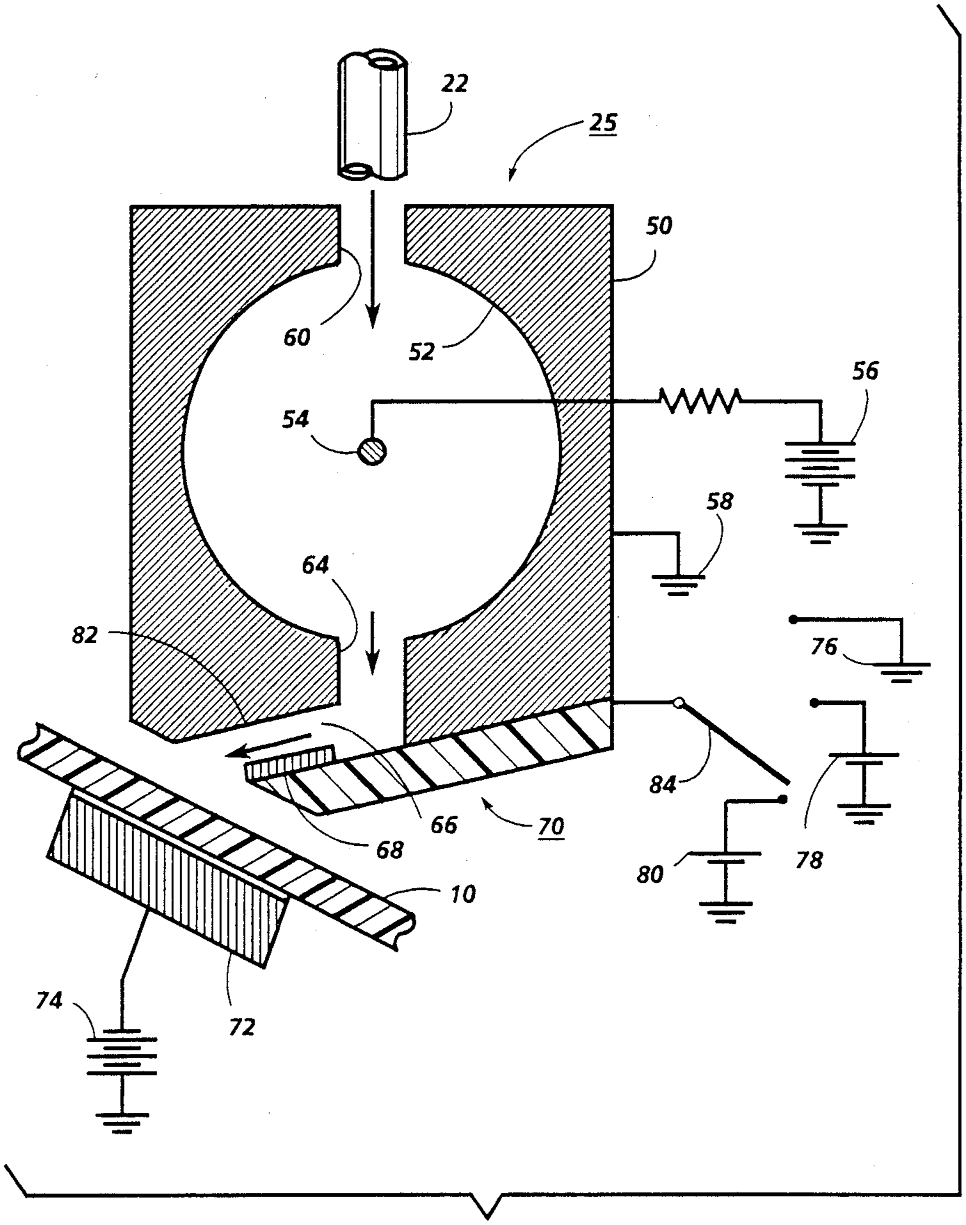
FIG. 3 is a partial cross-sectional elevation view showing the marking head of a fluid jet assisted ion projection printing apparatus.

As illustrated in FIG. 3, the ion projection device 25 comprises a housing 50 including an ion generation region including an electrically conductive chamber 52, a corona wire 54 extending substantially coaxially in the chamber, a high potential source 56, on the order of several thousand volts DC, applied to the wire 54, and a reference potential source 58, such as ground, connected to the wall of chamber 52. The corona discharge around the wire creates a source of ions, of a given polarity which are attracted to the grounded chamber wall and fill the chamber with a space charge.

An axially extending inlet channel 60 delivers pressurized transport fluid (preferably air) into the chamber 52 from a suitable source, schematically illustrated by the tube 62. An axially extending outlet channel 64 conducts the transport fluid from the corona chamber 52 to the exterior of the housing 50, past an ion modulation region 66. As the transport fluid passes through and exists the chamber 52, through outlet channel 64, it entrains a number of ions and moves them into the ion modulation region 66, past ion modulation electrodes 68, on a marking array 70.

Ions allowed to pass completely through and out of the housing 50, through the outlet channel 64, come under the influence of accelerating back electrode 72 which is connected to a high potential source 74, on the order of several thousand volts DC, of a sign opposite to that of the corona source 54. The charge receptor 10 moves over the backing electrode 72 and collects the ions upon its surface.

Once the ions have been swept into the outlet channel 24 by the transport fluid, it becomes necessary to render the ion-laden fluid stream intelligible. This is accomplished in the modulation region by individually switching the modulation electrodes 68, among three discrete modulation voltage sources 76, 78 and 80. The voltages supplied by the three modulation voltage sources provide maximum, intermediate and zero charge densities on the receptor 10 for each electrode. The voltages are applied in accordance with the intelligence to be recorded in order to produce developable latent images at two of the charge densities while the third charge density corresponds to a background charge level.

Figure 1B:
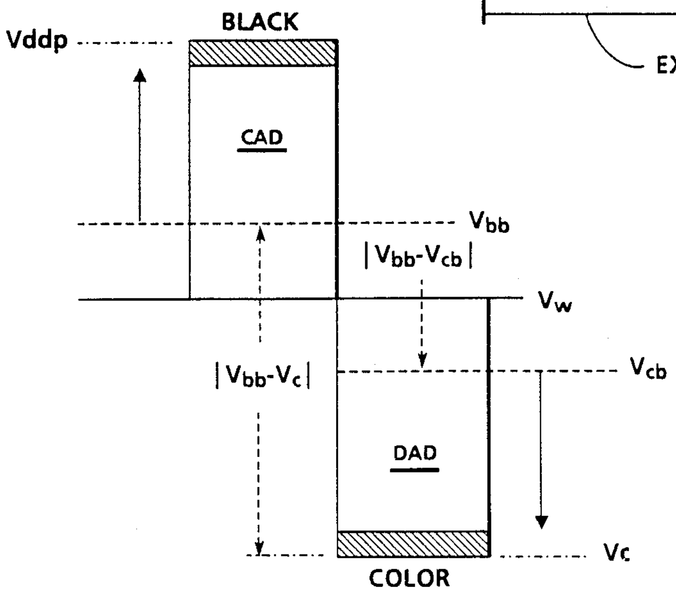
FIG. 1*b* is a plot of photoreceptor potential illustrating single-pass, highlight color latent image characteristics.

The voltage sources 76, 78 and 80 correspond to the voltages $V_{ddp}$, $V_w$ and $V_c$, respectively, illustrated in FIGS. 1*a* and 1*b*. Thus, the image charge density on the receptor 10 due to the modulation voltage 76 being applied to the electrodes 68 is a maximum. The charge density due to the voltage source 78 is intermediate and the density due to the voltage 80 is zero or the residul level indicated in FIG. 1*a*.

The modulation electrode 68 and the grounded opposite wall 82, which bridge the gap across the outlet channel, comprise a capacitor, across which the modulation voltage potentials of sources 76, 78 and 80, may be applied, when connected through switch 84. Thus, an electric field, extending in a direction transverse to the direction of the transport fluid flow, is selectively established between a given modulation electrode 68 and the grounded opposite wall 82.

After the images have been rendered visible with the toners, a sheet of support material 86 is moved into contact with the toner images at transfer station C. The sheet of support material is advanced to transfer station C by conventional sheet feeding apparatus, not shown. Preferably, sheet feeding apparatus includes a feed roll contacting the uppermost sheet of a stack copy sheets. Feed rolls rotate so as to advance the uppermost sheet from stack into a chute which directs the advancing sheet of support material into contact with photoconductive surface of belt 10 in a timed sequence so tht the toner powder image developed thereon contacts the advancing sheet of support material at transfer station D.

Because the composite image developed on the belt consists of both positive and negative toner, a pre-transfer corona discharge member 88 is provided to condition the toner for effective transfer to substrate using corona discharge.

Transfer station C includes a corona generating device 90 which sprays ions of a suitable polarity onto the backside of sheet 86. This attracts the charged toner power images from the belt 10 to sheet 86. After transfer, the sheet continues to move, in the direction of arrow 92, onto a conveyor (not shown) which advances the sheet to fusing station D.

Fusing station D includes a fuser assembly, indicated generally by the reference numeral 94, which permanently affixes the transferred powder image to sheet 86. Preferably, fuser assembly 84 comprises a heated fuser roller 96 and a backup roller 98. Sheet 86 passes between fuser roller 86 and backup roller 88 with the toner powder image contacting fuser roller 86. In this manner, the toner powder image is permanently affixed to sheet 86. After fusing, a chute, not shown, guides the advancing sheet 86 to a catch tray, also not shown, for subsequent removal from the printing machine by the operator.

After the sheet of support material is separated from surface of belt 10, the residual toner particles carried by the non-image areas on the belt are removed therefrom. These particles are removed at cleaning station E.

What is claimed is:

1. Method of forming tri-level images, said method including the steps of:

using ion projection apparatus, forming a tri-level latent electrostatic image on a charge retentive surfce which image comprises first and second image areas and a background area which are at discrete voltage levels;

electrically biasing a first developer member to a voltage level that is offset from said background area, in the direction of said first image area;

electrically biasing a second developer member to a voltage level that is offset from said background area, in the direction of said second image area;

using said first developer member, applying a first toner to said charge retentive surface for developing said first image area; and using said second developer member, applying a second toner to said charge retentive surface for developing said second image area.

2. The method of claim 1 wherein the step of using an ion projection apparatus includes forming a tri-level latent electrostatic image on a charge retentive surface by depositing ions on a first image area at a relatively high density, by depositing ions on a second image area at a relatively low density and by depositing ions on a background area at a charge density intermediate said relatively high and low densities.

3. The method of claim 2 wherein the step of using an ion projection apparatus includes modulating the voltages applied to control electrodes of said ion projection apparatus to three discrete levels for controlling the deposition of ions emitted therefrom contiguous each of a plurality of such electrodes.

4. Apparatus for forming tri-level images, said apparatus comprising:

ion projection apparatus including a plurality of control electrodes;

means for modulating the voltages applied to said control electrodes whereby each electrode is capable of depositing ions at three discrete charge densities on a charge retentive surface thereby producing two image areas and a background area on said charge retentive surface.

5. Apparatus according to claim 4 wherein said modulating means comprises switch means selectively connectible to three discrete voltage sources.

6. Apparatus according to claim 5 including:

means for applying a first toner to said charge retentive surface for developing one of said image areas;

means for applying a second toner to said charge retentive surface for developing another of said image areas;

means for electrically biasing said first toner applying means to a voltage level that is offset from the voltage level of said background area, in the direction of the voltage level of said first image area; and means for electrically biasing said second toner applying means to a voltage level that is offset from the voltage level of said background area, in the direction of the voltage level said second image area.

7. Apparatus according to claim 6 wherein said electrical biasing means comprise means for biasing said toner applying means to a voltage of approximately 100 volts.

* * * * *